G. T. JEWITT.
APPARATUS FOR TREATING SKINS.
APPLICATION FILED SEPT. 27, 1911.
1,027,545.
Patented May 28, 1912.
3 SHEETS—SHEET 2.
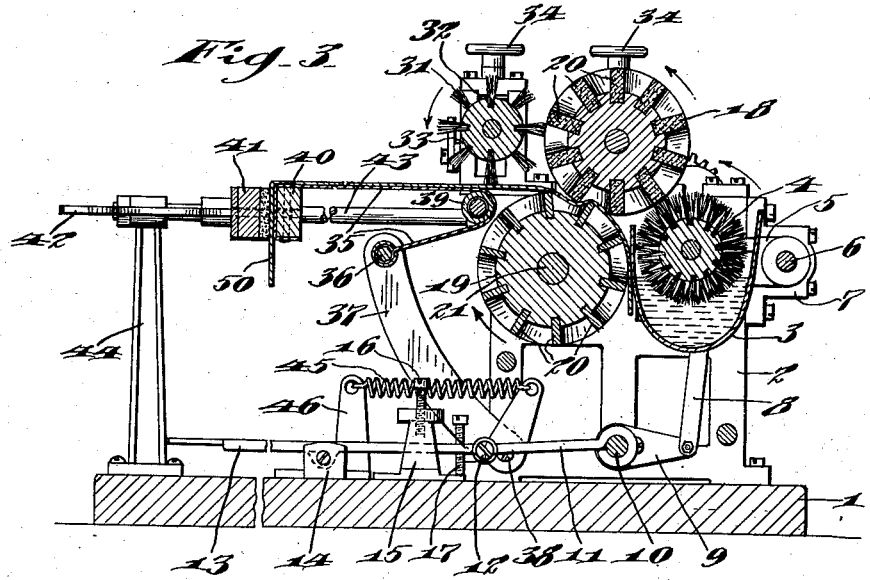
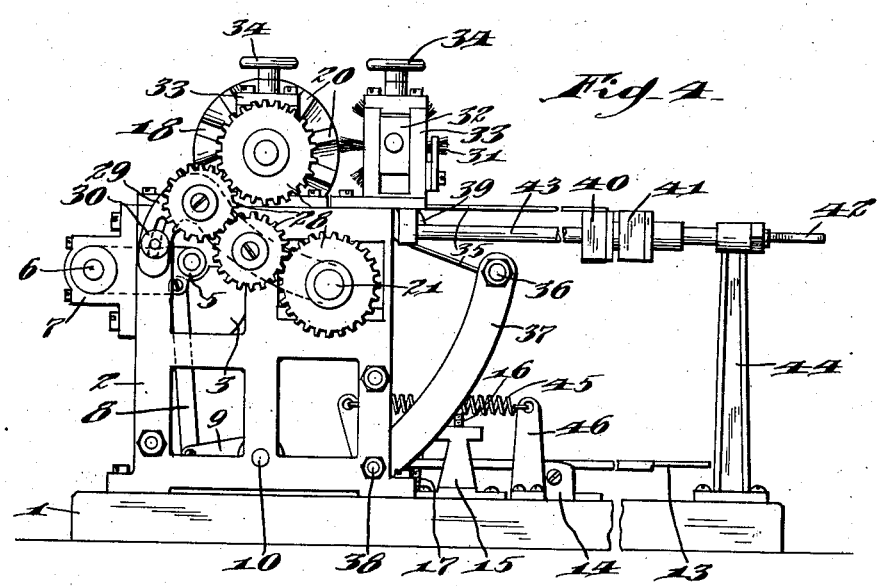
WITNESSES:
INVENTOR
George T. Jewitt,
BY Joshua R. H. Potts.
Attorney G. T. JEWITT.
APPARATUS FOR TREATING SKINS.
APPLICATION FILED SEPT. 27, 1911.
1,027,545.
Patented May 28, 1912.
3 SHEETS—SHEET 3.
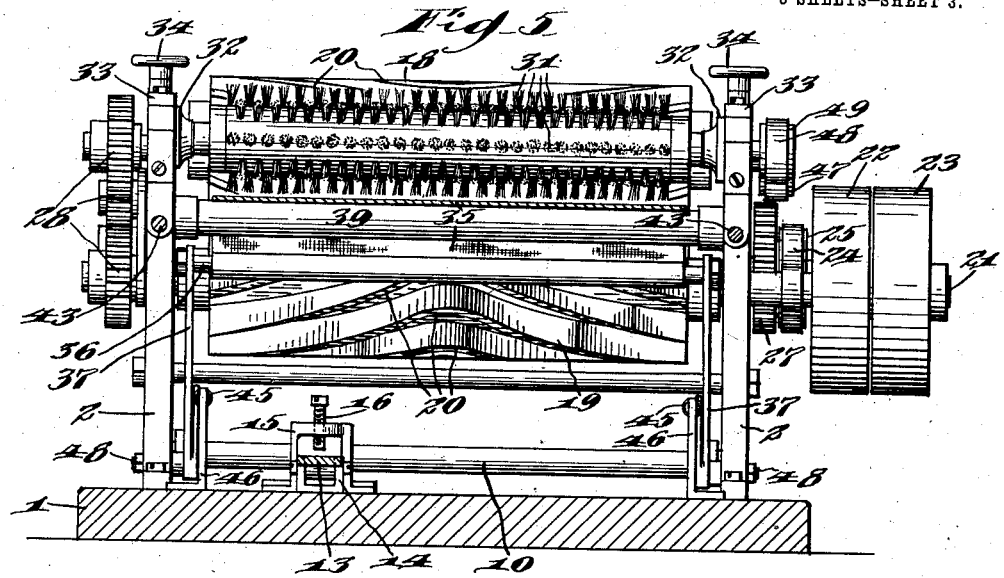
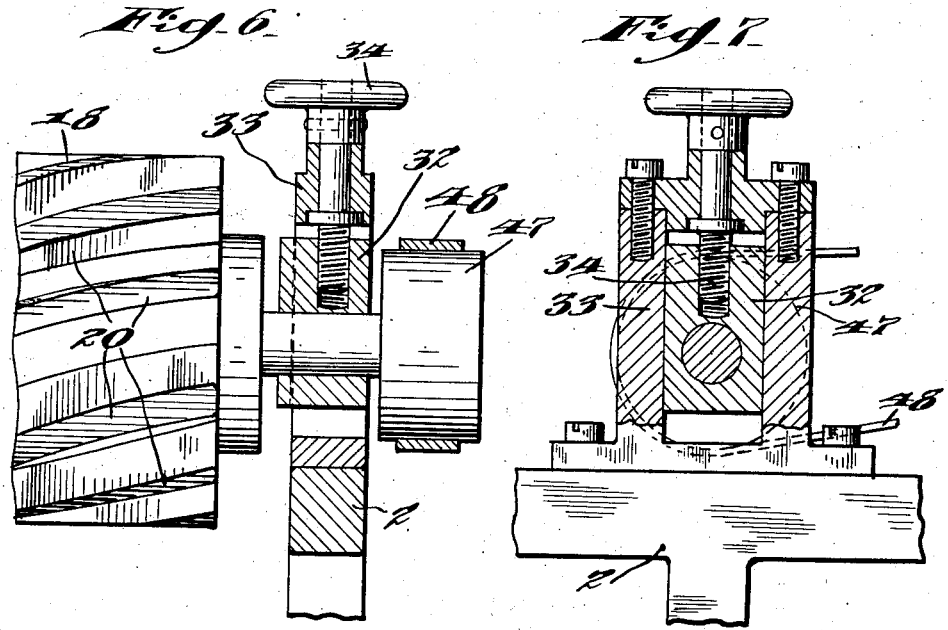
WITNESSES:
INVENTOR
George T. Jewitt,
BY Joshua R. H. Potts,
Attorney

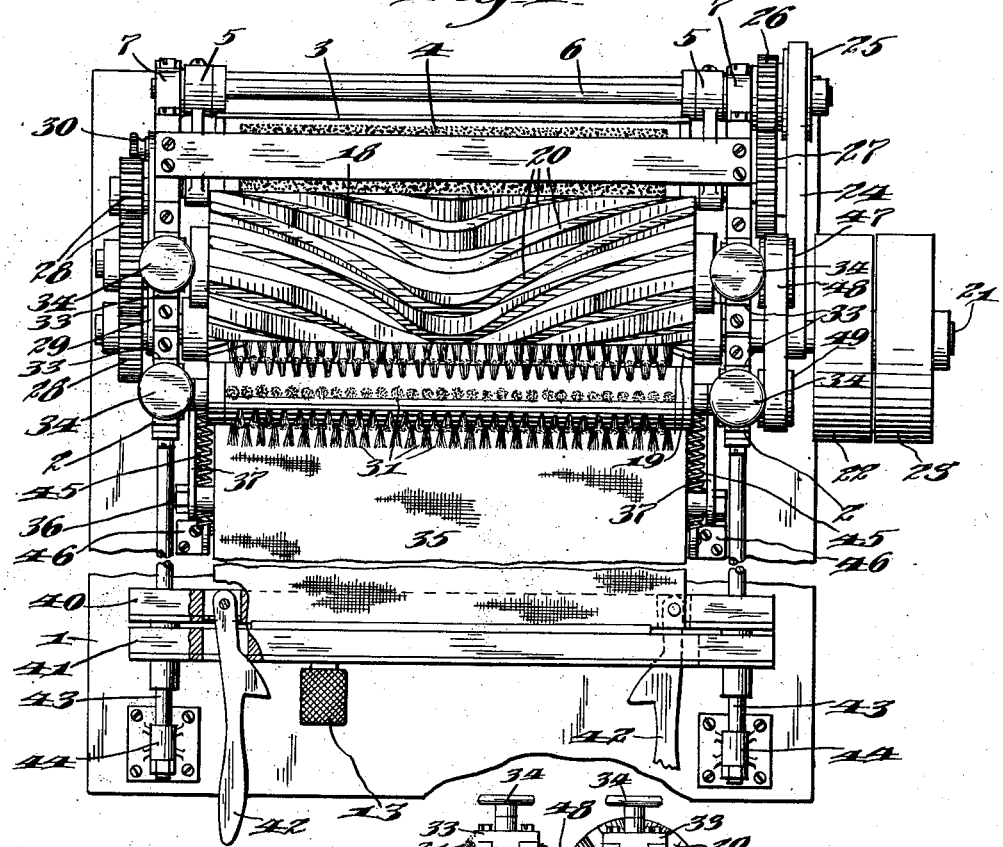

UNITED STATES PATENT OFFICE.

GEORGE T. JEWITT, OF PHILADELPHIA, PENNSYLVANIA.

APPARATUS FOR TREATING SKINS.

1,027,545.  Specification of Letters Patent.  Patented May 28, 1912.

Application filed September 27, 1911. Serial No. 651,478.

*To all whom it may concern:*

Be it known that I, GEORGE T. JEWITT, a subject of the King of Great Britain, residing at Philadelphia, in the county of Philadelphia and State of Pennsylvania, have invented certain new and useful Improvements in Apparatus for Treating Skins, of which the following is a specification.

My invention relates to improvements in apparatus for treating skins, and more particularly to an apparatus for applying the season to the skins, and at the same time softening the skins.

A further object is to provide an improved apparatus of this character which will apply the season evenly to one side of the skin only, and which will prevent the season from discoloring the opposite side of the skin. Heretofore in apparatus for this purpose, it has been practically impossible to keep the season on one side of the skin only, because the tables or other mechanisms supporting the skins become dirty from the season, and when skins of different sizes are supported thereon, the larger skins receive on their under face, the surplus season applied to the smaller skins. To overcome this, and to prevent the skin supporting medium from coming into contact with the season applying means, and to provide improved means for applying the season, which also operate to soften the skin, is the primary object of my invention, and it will now be described in detail.

With these and other objects in view, the invention consists in certain novel features of construction and combinations and arrangements of parts, as will be more fully hereinafter described and pointed out in the claims.

In the accompanying drawings: Figure 1, is a broken plan view illustrating my improvements. Fig. 2, is a view in side elevation. Fig. 3, is a view in vertical longitudinal section. Fig. 4, is a view in side elevation opposite to Fig. 2. Fig. 5, is a view in vertical transverse section, and Figs. 6 and 7 are enlarged views partly in section and partly in elevation illustrating the supporting means for the roll 18.

1, represents a base to which a frame 2 is secured, and supports a tank 3 extending transversely of the frame and having an open top. This tank is adapted to contain the season to be applied to the skins, and in its upper open top, a rotary brush 4 is located, and this brush is supported in the free ends of arms 5, which are secured to a transverse shaft 6 mounted in bearings 7. These arms 5 are connected by links 8, with crank arms 9 on a shaft 10, the latter supported in the lower portion of the frame, and provided with a forwardly projecting crank arm 11 which has a pin and slot connection 12 with a foot lever 13. Lever 13 is fulcrumed between its ends in a bracket 14, and projects through a yoke 15. In this yoke 15, a screw 16 is positioned, and adapted to be adjusted toward and away from the foot lever, and a second screw 17 is mounted in the lever and adapted to bear upon the base of the bracket, so that by the adjustment of these screws, the movement of the foot lever can be varied. In other words, the movement of the lever may be regulated in accordance with the adjustment of the season applying brush 4, so as to supply just the necessary quantity. This brush 4 contacts with my improved upper corrugated roll 18, which is positioned above and slightly in rear of my improved lower corrugated roll 19. When I use this term "corrugated roll", I use it broadly to cover a roll which is provided on its periphery with a circular series of flanges or projecting webs 20, which have a spiral relationship or angular relationship with each other, whereby if such flanges were continued, they would form complete spirals, yet for many purposes it is not necessary to continue them beyond a fraction of a spiral, but the invention is in no wise limited to the angular relationship, nor to the length of the spiral, nor to other immaterial features, but is broadly to two spiral rolls with the flanges of one positioned to move between the flanges of the other, and whereby the skin illustrated at 50 will be manipulated so as to soften the same as well as apply the season. The flanges on the respective rolls are arranged diagonally in the center to the ends of the rolls, and the diagonally positioned flanges of one roll move between the diagonally positioned flanges of the other roll, whereby the skin is wrinkled in diagonal lines from its center to its ends, and thereby rendered soft and flexible, as well as insuring a uniform distribution of the seasoning. The flanges of the upper roll 18 are preferably of leather or some other relatively soft material, while those of the lower roll are preferably of metal, but this may of course be varied without departing from the invention.

The lower roll 19 is fixed upon a drive shaft 21, upon which fast and loose pulleys 22 and 23 are located, and the former is adapted to be driven from any source of power. A belt 24 connects shaft 21 with a pulley 25 loose on shaft 6, and fixed to turn with a gear 26. This gear 26 meshes with a gear 27 secured to the brush 4, so as to compel the brush to revolve in the same direction as the roll 18. A train of gears 28 connect shaft 21 with the roll 18, and the gears of this train are mounted in a pivoted bracket 29 secured by a set screw 30 to enable the train of gear to be adjusted in accordance with the adjustment of the rolls as will be well understood.

In front of the roll 18, a rotary brush 31 is located, and the shafts of this brush 31 and the roller 18 are supported in bearings 32 adjustable vertically in brackets 33 by means of set screws 34, so that these members may be properly positioned with relation to the other parts of the mechanism. This brush 31 serves to feed the skin 20 between the rolls 18 and 19 as said skin is moved off of its supporting apron 35. This apron 35 is connected at one end to a rod 36 secured in the long ends of bell-crank-levers 37, the latter pivotally supported on bolts 38 in frame 2. The apron is preferably of canvas or of some other flexible material, and is passed over a roller 39 in close proximity to the brush 31, but out of contact therewith, and is connected to one bar 40 of a clamp 41. While I give these parts 40 and 41 separate reference characters, they as a matter of fact, constitute a clamp which is operated by cam levers 42, so as to clamp or release the skin. This clamp 41 is mounted to slide on guide rods 43 secured in uprights 44 on base 1, and the operator grasps the cam levers 42 to manipulate the apron and the skin thereon. To facilitate this movement of the apron, the shorter members of the bell-crank-levers 37 are connected by coiled springs 45 with brackets 46 on base 1, and these springs serve to draw the apron inwardly and hold the apron taut in all positions. To transmit a rotary motion to the brush 31, a belt 48 is provided and connects pulleys 47 and 49 on roller 18 and brush 31 respectively.

The operation of my improved apparatus is as follows: One end of the skin 50 is secured in the clamp 41 and the other end of the skin is laid flat upon the apron 35. As the apron is moved inwardly, brush 31 will move the skin to a point between the rolls 18 and 19, while the apron moves around roller 39 and away from the said rolls 18 and 19. It is to be understood of course, that the brush 4 is revolving and applying the season to the flanges 20 of roll 18, and as these flanges bend the skin between the flanges of roll 19, the season will be applied to one face of the skin, and at the same time, the skin will be softened by reason of the corrugated rolls. Brush 31 not only serves to feed the skin toward the rolls 18 and 19, but also brushes off the surplus season as the skin is drawn out. The skin is then reversed so that the other end receives the season, and the skin may be manipulated back and forth in accordance with the way the season is taken up. In other words, a hungry skin will require a greater manipulation than another.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In an apparatus for treating skins, the combination with two corrugated skin bending rolls, the outwardly projecting diagonally positioned flanges of one roll constructed to move between the diagonally positioned flanges of the other roll, whereby the skin is wrinkled in diagonal lines from its center to its edges, substantially as described.

2. In an apparatus for treating skins, the combination with two corrugated skin bending rolls, the outwardly projecting diagonally positioned flanges of one roll constructed to move between the diagonally positioned flanges of the other roll, whereby the skin is wrinkled in diagonal lines from its center to its edges, and means for supplying season to one of said rolls, substantially as described.

3. In an apparatus for treating skins, the combination with a frame, of two corrugated skin bending rolls, the outwardly projecting flanges of one roll constructed to move between the flanges of the other roll, whereby the skin is wrinkled in diagonal lines from its center to its edges, a season containing receptacle in said frame, and a brush in said receptacle touching the corrugations of one of said rolls, substantially as described.

4. In an apparatus for treating skins, the combination with a frame, of two corrugated skin bending rolls, the outwardly projecting flanges of one roll constructed to move between the flanges of the other roll, whereby the skin is wrinkled in diagonal lines from its center to its edges, a season containing receptacle in said frame, a brush in said receptacle touching the corrugations of one of said rolls, and means for raising and lowering said brush, substantially as described.

5. In an apparatus for treating skins, the combination with a base, a frame on the base, of rolls supported on the base, and adapted to receive a skin between them, a season receptacle, a brush in said receptacle contacting with one of said rolls, a foot lever, and means connecting said foot lever with said brush, whereby the movement of the foot lever moves the brush toward and away from said roll with which it is normally in contact, substantially as described.

6. In an apparatus for treating skins, the combination with a base, a frame on the base, of rolls supported on the base, and adapted to receive a skin between them, means for applying season to one of said rolls, horizontal rods, a skin clamp mounted to slide on said rods, pivoted members, a roller adjacent the said rolls, a skin supporting apron secured to said clamp and positioned over said roller, and pivoted devices to which the other end of said apron is secured, substantially as described.

7. In an apparatus for treating skins, the combination with a base, a frame on the base, of rolls supported on the base, and adapted to receive a skin between them, means for applying season to one of said rolls, horizontal rods, a skin clamp mounted to slide on said rods, pivoted members, a roller adjacent the said rolls, a skin supporting apron secured to said clamp and positioned over said roller, pivoted devices to which the other end of said apron is secured, springs connected to said pivoted devices, and exerting an inward pull on said apron, said pivoted devices tending to draw the apron away from the first-mentioned rolls, substantially as described.

8. In an apparatus for treating skins, the combination with a base, a frame on the base, of rolls supported on the base, and adapted to receive a skin between them, means for applying season to one of said rolls, horizontal rods, a skin clamp mounted to slide on said rods, pivoted members, a roller adjacent the said rolls, a skin supporting apron secured to said clamp and positioned over said roller, pivoted devices to which the other end of said apron is secured, and a brush positioned above said apron and adapted to direct the skin between said first-mentioned rolls, substantially as described.

9. In an apparatus for treating skins, the combination with a base, a frame on the base, of rolls supported on the base, and adapted to receive a skin between them, means for applying season to one of said rolls, horizontal rods, a skin clamp mounted to slide on said rods, pivoted members, a roller adjacent the said rolls, a skin supporting apron secured to said clamp and positioned over said roller, pivoted devices to which the other end of said apron is secured, springs connected to said pivoted devices, and exerting an inward pull on said apron, said pivoted devices tending to draw the apron away from the first-mentioned rolls, and a brush positioned above said apron and adapted to direct the skin between said first-mentioned rolls, substantially as described.

10. In an apparatus for treating skins, the combination with a base, a frame on the base, of rolls supported on the base, and adapted to receive a skin between them, means for applying season to one of said rolls, horizontal rods, a skin clamp mounted to slide on said rods, pivoted members, a roller adjacent the said rolls, a skin supporting apron secured to said clamp and positioned over said roller, pivoted devices to which the other end of said apron is secured, cam levers constructed to operate said clamp to secure a skin between them, and said cam levers serving as handles for the manipulation of said apron and the skin thereon, substantially as described.

11. In an apparatus for treating skins, the combination with a base, a frame on the base, of rolls supported on the base, and adapted to receive a skin between them, means for supplying season to one of said rolls, horizontal rods, a skin clamp mounted to slide on said rods, pivoted members, a roller adjacent the said rolls, a skin supporting apron secured to said clamp and positioned over said roller, pivoted devices to which the other end of said apron is secured, springs connected to said pivoted devices, and exerting an inward pull on said apron, said pivoted devices tending to draw the apron away from the first-mentioned rolls, cam levers constructed to operate said clamp to secure a skin between them, and said cam levers serving as handles for the manipulation of said apron and the skin thereon, substantially as described.

12. In an apparatus for treating skins, the combination with a base, a frame on the base, of rolls supported on the base, and adapted to receive a skin between them, means for applying season to one of said rolls, horizontal rods, a skin clamp mounted to slide on said rods, pivoted members, a roller adjacent the said rolls, a skin supporting apron secured to said clamp and positioned over said roller, pivoted devices to which the other end of said apron is secured, a brush positioned above said apron and adapted to direct the skin between said first-mentioned rolls, cam levers constructed to operate said clamp to secure a skin between them, and said cam levers serving as handles for the manipulation of said apron and the skin thereon, substantially as described.

13. In an apparatus for treating skins, the combination with a base, a frame on the base, of rolls supported on the base, and adapted to receive a skin between them, means for applying season to one of said rolls, horizontal rods, a skin clamp mounted to slide on said rods, pivoted members, a roller adjacent the said rolls, a skin supporting apron secured to said clamp and positioned over said roller, pivoted devices to which the other end of said apron is secured, springs connected to said pivoted devices, and exerting an inward pull on said apron, said pivoted devices tending to draw the apron away from the first-mentioned rolls, a brush positioned above said apron and adapted to direct the skin between said first-mentioned rolls, cam levers constructed to operate said clamp to secure a skin between them, and said cam levers serving as handles for the manipulation of said apron and the skin thereon, substantially as described.

14. In an apparatus for treating skins, the combination with two corrugated skin bending rolls, the outwardly projecting diagonally positioned flanges of one roll constructed to move between the diagonally positioned flanges of the other roll, whereby the skin is wrinkled in diagonal lines from its center to its edges, and means constructed to feed a skin to said rolls and maintained out of contact with said rolls, substantially as described.

15. In an apparatus for treating skins, the combination with two corrugated skin bending rolls, the outwardly projecting diagonally positioned flanges of one roll constructed to move between the flanges of the other roll, whereby the skin is wrinkled in diagonal lines from its center to its edges, means for supplying season to one of said rolls, and means constructed to feed a skin to said rolls and maintained out of contact with said rolls, substantially as described.

16. In an apparatus for treating skins, the combination with a frame, of two corrugated skin bending rolls, the outwardly projecting flanges of one roll constructed to move between the flanges of the other roll, whereby the skin is wrinkled in diagonal lines from its center to its edges, a season containing receptacle in said frame, a brush in said receptacle touching the corrugations of one of said rolls, and means constructed to feed a skin to said rolls and maintained out of contact with said rolls, substantially as described.

17. In an apparatus for treating skins, the combination with a frame, of two corrugated skin bending rolls, the outwardly projecting flanges of one roll constructed to move between the flanges of the other roll, whereby the skin is wrinkled in diagonal lines from its center to its edges, a season containing receptacle in said frame, a brush in said receptacle touching the corrugations of one of said rolls, means for raising and lowering said brush, and means constructed to feed a skin to said rolls and maintained out of contact with said rolls, substantially as described.

18. In an apparatus for treating skins, the combination with a base, a frame on the base, of rolls supported on the base, and adapted to receive a skin between them, a season receptacle, a brush in said receptacle contacting with one of said rolls, a foot lever, means connecting said foot lever with said brush, whereby the movement of the foot lever moves the brush toward and away from said roll with which it is normally in contact, and means constructed to feed a skin to said rolls and maintained out of contact with said rolls, substantially as described.

In testimony whereof I have signed my name to this specification in the presence of two subscribing witnesses.

GEORGE T. JEWITT.

Witnesses:
THOMAS HUGHES,
R. H. KRENKEL.

---

Copies of this patent may be obtained for five cents each, by addressing the "Commissioner of Patents, Washington, D. C."